(12) United States Patent
Ashcroft

(10) Patent No.: US 6,174,022 B1
(45) Date of Patent: Jan. 16, 2001

(54) ELONGATED CARGO OPENING IN CARGO VAN SIDE WALL

(76) Inventor: Ronald W. Ashcroft, 28966 Sibley Rd., Romulus, MI (US) 48174

( * ) Notice: Under 35 U.S.C. 154(b), the term of this patent shall be extended for 0 days.

(21) Appl. No.: 09/328,853

(22) Filed: Jun. 9, 1999

(51) Int. Cl.[7] .................................................. B60R 27/00
(52) U.S. Cl. ............................................ 296/181; 296/183
(58) Field of Search ................................. 296/37.1, 37.6, 296/57.1, 146.1, 148, 155, 181, 183

(56) References Cited

U.S. PATENT DOCUMENTS

| | | | |
|---|---|---|---|
| 2,820,667 | * 1/1958 | Benaroya et al. | 296/155 |
| 3,068,038 | * 12/1962 | Douglass, Jr. | 296/183 X |
| 3,416,836 | * 12/1968 | Swanby | 296/148 |
| 4,216,988 | 8/1980 | Weiss . | |
| 4,268,084 | 5/1981 | Peters . | |
| 4,302,044 | * 11/1981 | Sims | 296/183 |
| 4,526,417 | 7/1985 | Dinkel et al. . | |
| 4,668,008 | 5/1987 | Stinson . | |
| 4,682,811 | 7/1987 | Ooguro . | |
| 4,690,609 | * 9/1987 | Brown | 296/181 X |
| 4,762,361 | 8/1988 | Horton et al. . | |
| 4,943,110 | 7/1990 | Pastva . | |
| 4,952,009 | 8/1990 | Mountz et al. . | |
| 5,007,672 | 4/1991 | Koch . | |
| 5,154,480 | 10/1992 | Jones . | |
| 5,282,663 | 2/1994 | Horton . | |
| 5,466,030 | 11/1995 | Harris et al. . | |
| 5,615,922 | * 4/1997 | Blanchard | 296/37.6 |
| 6,059,341 | * 5/2000 | Jensen et al. | 296/37.6 |

FOREIGN PATENT DOCUMENTS 2 090 798 * 6/1982 (GB) ................................. 296/181

* cited by examiner

Primary Examiner—D. Glenn Dayoan
Assistant Examiner—Lori Coletta
(74) Attorney, Agent, or Firm—Reising, Ethington, Barnes, Kisselle, Learman & McCulloch, P.C.

(57) ABSTRACT

The vehicle mounted cargo van has a floor, rigid side walls, a rigid front wall, a roof and a rear wall. The rear wall is a door assembly that opens substantially the entire rear of the van. An elongated cargo opening is provided in one of the rigid side walls. The cargo opening extends upwardly from the floor about one meter. The horizontal length of the elongated cargo opening is longer than the length of the longest elongated cargo that is to be transported in the cargo van. An elongated cargo door assembly is pivotally attached to the cargo van for pivotal movement about a horizontal axis that is slightly below the elongated cargo opening. A latch assembly secures the elongated door assembly in a closed position. When the latch assembly is released, the elongated cargo door assembly pivots about 180° to an open position.

12 Claims, 3 Drawing Sheets

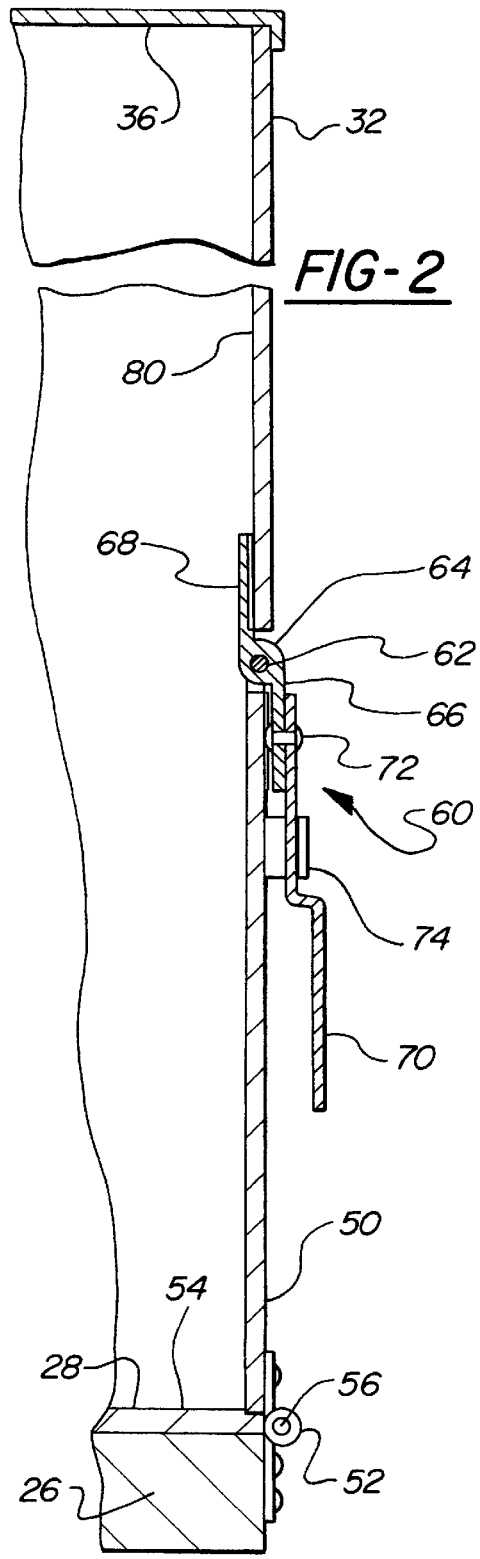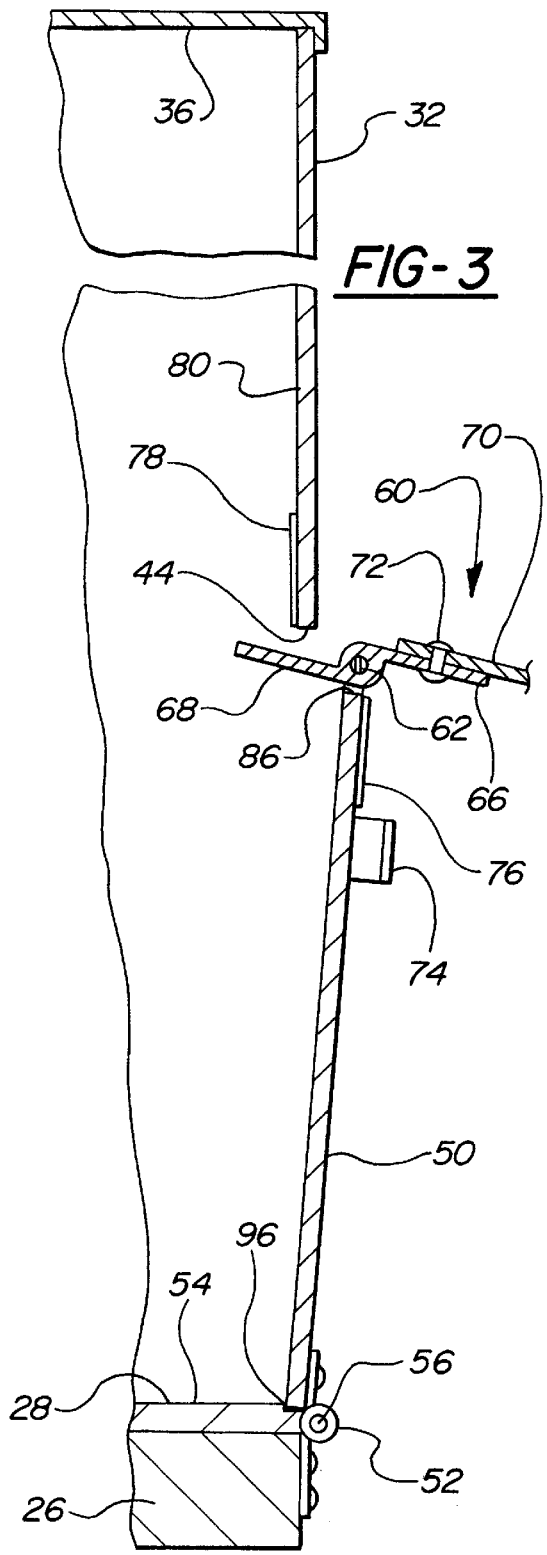

ELONGATED CARGO OPENING IN CARGO VAN SIDE WALL

TECHNICAL FIELD

This invention is in a cargo van and more particularly in a cargo van with a door in a side wall for elongated cargo.

BACKGROUND OF THE INVENTION

Van type vehicles are used for transporting cargo that needs to be protected from the elements as well as cargo that needs to be secured to prevent pilferage. Normally cargo vans have one or more rear doors that open substantially the entire rear wall for receiving and discharging cargo. These vans can receive palletized cargo, boxed cargo, containers or loose cargo. However, they are generally not suitable for transporting heavy elongated articles.

Heavy elongated articles are generally transported on flatbed vehicles or vehicles with an open top. The open top allows heavy elongated articles to be loaded and unloaded with cranes where suitable cranes are available. Some protection from the elements can be provided by canvas covers on flatbed vehicles and on vans with open tops. In situations where cranes are not available, the usual method of unloading elongated articles from a flatbed vehicle is with a forklift. Forklifts with adequate size, that are equipped for rough terrain use, can unload elongated cargo from flatbed trucks or trailers at construction sites and other locations. Forklifts are generally not capable of lifting and unloading elongated cargo from cargo vans.

Cargo, such as conduit pipe used by electricians and plastic pipe and copper pipe used by plumbers, is generally banded together in bundles that are up to about four feet wide, as long as the pipes and any desired height. These elongated bundles can be loaded and unloaded from flatbed vehicles with forklifts. However, very few construction sites need a truck or trailer load of such pipe at one time. Plumbers and electricians also need supplies such as wire, switches, couplings, valves and solder that come in cardboard boxes. These parts and the boxes must be kept dry. The usual procedure employed to protect such parts from moisture is to transport them in enclosed vans.

There are two common alternative systems for delivering cargo that includes elongated items and other items that are to be kept dry. The elongated articles can be delivered by a flatbed vehicle and the other cargo can be delivered in an enclosed van or the bundles of pipe or other elongated cargo can be broken apart for manual loading and unloading. Both of these alternatives substantially increase the cost of delivering the cargo suggested above and other related cargo to construction sites. cargo vans and semi-trailers are available that have an enclosed front portion and a flatbed rear portion. These units can protect the cargo that requires a dry enclosure and simultaneously transport elongated articles that can be loaded on and unloaded from the side of the flatbed portion. The major drawback of these cargo transporters is that they tend to be longer than required. The extra length may complicate movement into and around construction areas. Another drawback is that in many cases such transporters will be only partially loaded.

A less common system for delivering general cargo is to use a van with soft sides. The soft sides are a canvas type material with reinforcement. Different arrangements are provided for opening the soft side of a cargo van. Some of these systems open the side for loading and unloading cargo including elongated cargo. The cargo transported in vans with soft sides must be secured to the van floor to hold it away from the canvas material. Securing cargo to a van floor can be difficult and time consuming.

SUMMARY OF THE INVENTION

An object of the invention is to provide a cargo van with a side door that permits the insertion and removal of elongated cargo with a forklift. Another object of the invention is to provide a cargo van with a rigid side door that keeps water out. A further object of the invention is to provide a cargo van with a side door that does not interfere with the movement of cargo into and out of the van through a rear door.

The cargo van has a van frame and a floor that is supported by a truck frame and chassis or by trailer wheels. Side walls, a front end wall and a roof are supported by the van frame. The rear wall is a rear door assembly that can open substantially the entire rear end of the van. The rear door assembly can include two door sections each of which is pivotally attached to a side wall for pivotal movement about a generally vertical axis. The rear door assembly can also be an overhead type door held by a track assembly.

The side door opening in one of the side walls extends upward from the van floor about one meter and can extend from near the front end wall to near the rear end wall. The upper portion of the side wall extends upwardly from the top of the side door opening to the roof. The side door opening is closed by one or more side door sections. The one or more side door sections are pivotally attached to the van frame for pivotal movement about a substantially horizontal axis. The door can be divided into two or more door sections to reduce the weight that has to be lifted to close the door or a door section. The side door is limited to a vertical height of about one meter so that the door can be opened to a position in which it extends substantially vertically downward from the hinges. If the vertical height of the side door opening is too large, the door section may contact the ground and prevent the door sections from opening fully.

The side door only needs to extend along the length of the cargo van a distance that exceeds the length of the longest elongated cargo that is to be transported.

A latch assembly is pivotally attached to the cargo van and has a pair of flat plate portions. One flat plate portion contacts the inside surface of the fixed upper side wall when the latch assembly is in a closed and latched position. The other flat plate portion contacts the outside surface of the side door when the door is closed and latched. Seals are provided as required. During movement of the vehicle along a roadway, the cargo van floor tends to flex up and down with the load. This causes vertical movement of the side door relative to the upper portion of the side wall. The latch assembly and the seals accommodate the vertical movement of the doors relative to the fixed upper side wall. Latch handles secure the latch assembly plate portions in a latched position.

BRIEF DESCRIPTION OF THE DRAWING

The presently preferred embodiment of the invention is disclosed in the following description and in the accompanying drawings, wherein:

FIG. 2 is an enlarged vertical sectional view showing the side wall and the elongated cargo door in a latched position;

FIG. 3 is a sectional view similar to FIG. 2 with the elongated cargo door unlatched and partially open.

DESCRIPTION OF THE PREFERRED EMBODIMENT

Figure 1:
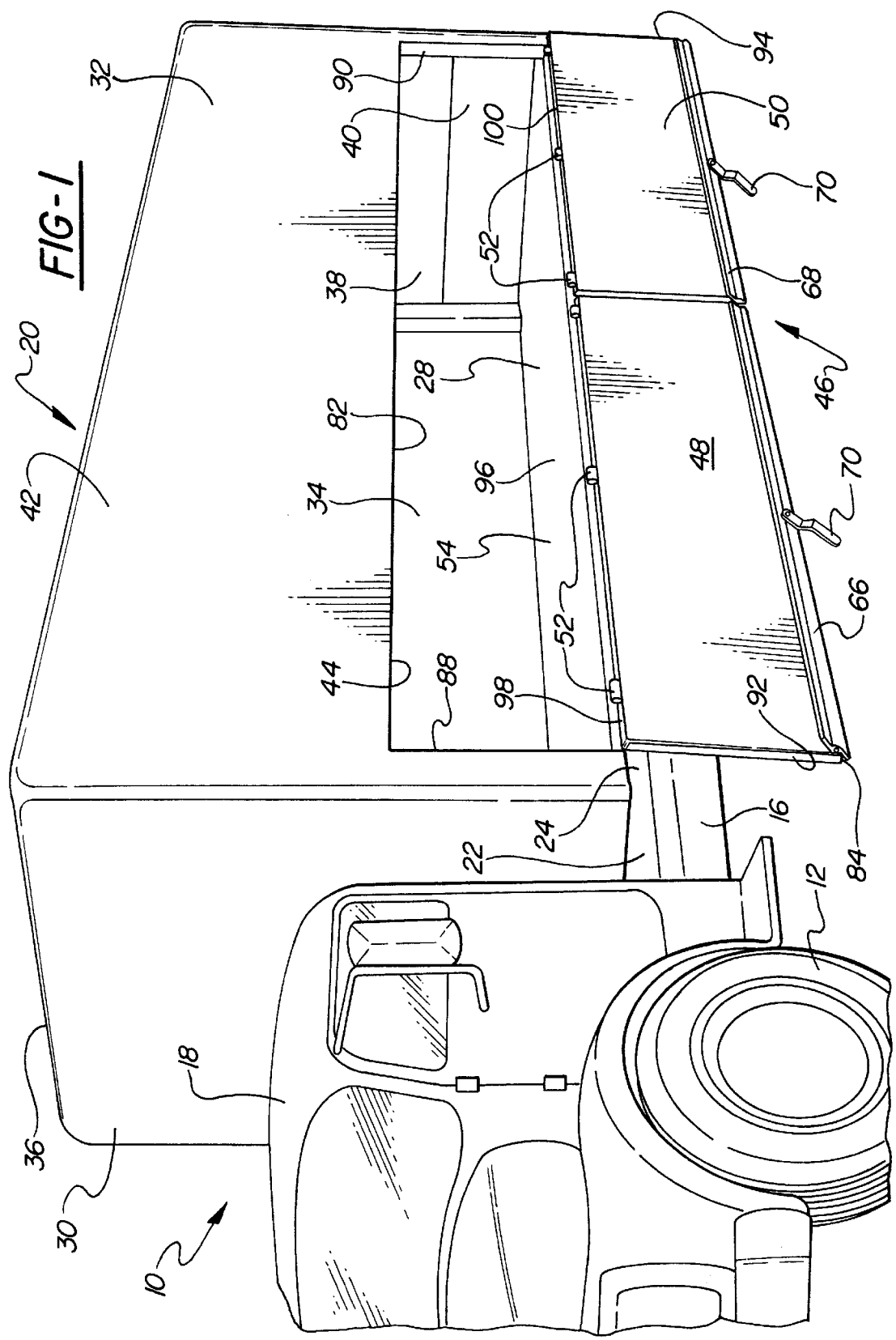
FIG. 1 is a perspective view of the left hand side of the cargo van with the side opening open.

The terms right hand and left hand will be as seen by a driver sitting in the driver's seat of the truck 10 shown in FIG. 1.

The truck 10 has front steered wheels 12 and rear driven wheels 14 that support a frame 16. An operator's cab 18 is mounted on the front end of the frame 16. A cargo van 20 is mounted on the rear portion of the frame 16.

The cargo van 20 has a van frame 22 with stringers 24 and cross members 26. The stringers 24 are clamped to the rails of the frame 16. The cross members 26 are secured to the stringers 24. A floor 28 is secured to the cross members 26.

A front wall 30 and two side walls 32 and 34 are secured to the cross members 26. A container top 36 is secured to the front wall 30 and the two side walls 32 and 34. A door 38 forms the rear wall 41. As shown the door 38 is an overhead door mounted on tracks (not shown). The door 38 is lifted during opening and the track directs the door panels 40 to horizontal positions directly under the top 36.

The front wall 30 and the right side wall 34 are solid walls as shown in the drawing. The left side wall 32 has a fixed upper portion 42 and an elongated cargo opening 44. A door assembly 46 is provided to open and close the cargo opening 44.

The door assembly 46 as shown, includes a front side door 48 and a rear side door 50 both of which are secured to cross members 26 by hinges 52. The hinges 52 have a common generally horizontal pivot axis 56 that is parallel to a plane including the upper surface 54 of the floor 28. The horizontal pivot axis 56 is slightly lower than the upper surface 54 of the floor 28 to provide an unobstructed opening 44.

Figure 4:
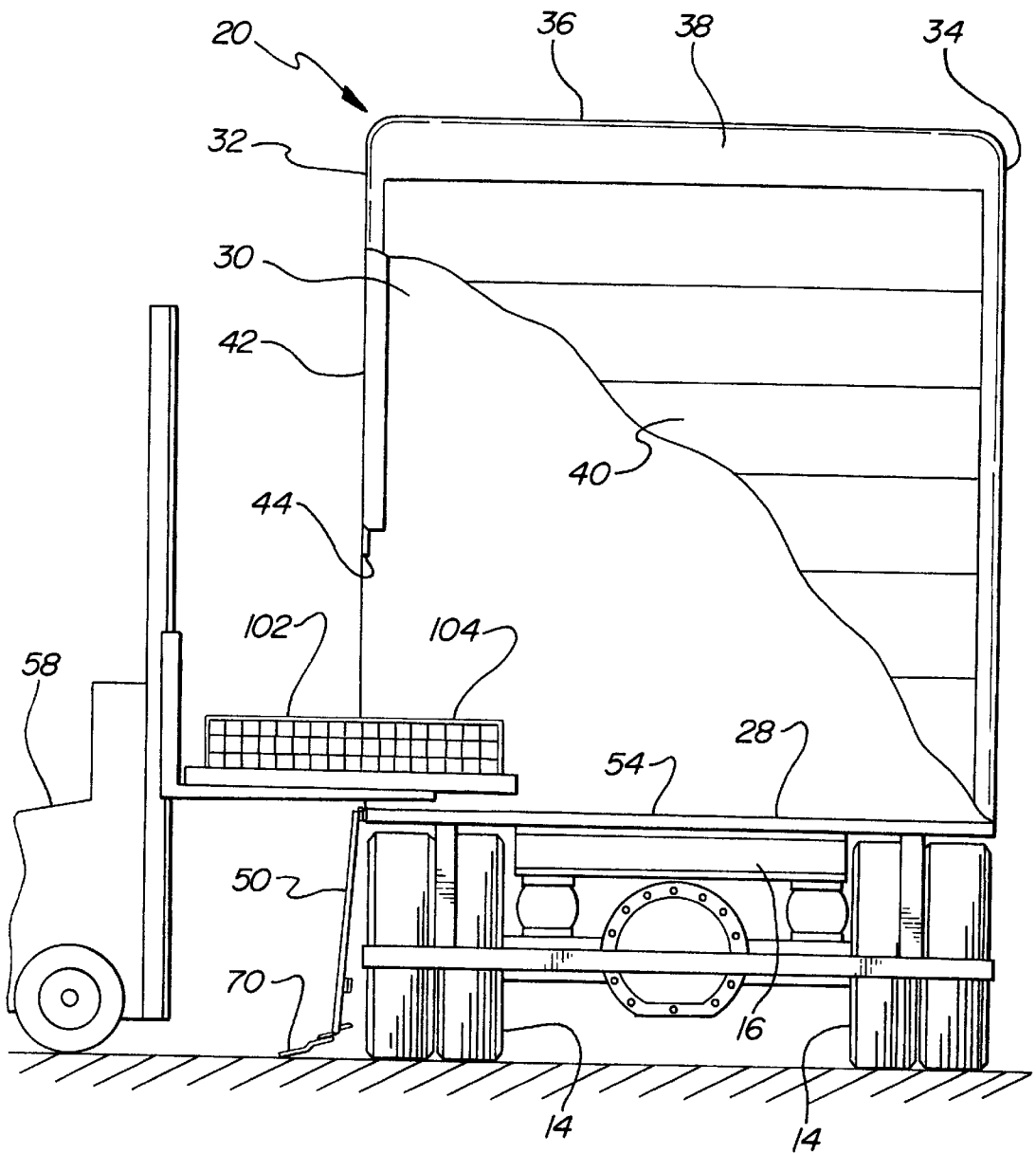
FIG. 4 is a rear view of the cargo van with parts broken away showing a forklift loading rectangular tubing in the van.

The vertical height of the doors 48 and 50 is preferably slightly less than the height of the pivot axis 56 above the ground when the cargo van 20 is loaded. That door height permits the doors 48 and 50 to be fully opened as shown in FIG. 4. When the doors 48 and 50 are opened and substantially vertical, a forklift truck 58 can move up close to the side of the cargo van 20 during loading and unloading of cargo.

A latch assembly 60 is secured to each door 48 and 50. These latch assemblies 60 have a pivot pin or pins 62 secured to an upper edge of the door 48 or 50. A trunnion member 64 pivotally receives the pin or pins 62. An outside plate 66 and an inside plate 68 are integral with the trunnion member 64. A handle 70 is pivotally attached to the outside plate 66 by a rivet 72. The handle 70 is first pivoted about the rivet 72 and out of the handle retainer 74 that is secured to the door 50 and then the handle 70 is moved to pivot the trunnion member 64 relative to the pin 62 to release the door 50 as shown in FIG. 3. The door 50 is free to move from the position shown in FIG. 3 to an open position as shown in FIGS. 1 and 4. To latch the door 50 in a closed position from the position shown in FIG. 3, the handle 70 is moved downward to rotate the trunnion member 64 about the pin 62 and move the plates 66 and 68 into the position shown in FIG. 2. The handle 70 is then rotated about the rivet 72 and into the handle retainer 74 to latch the door 50 in a closed position. In the closed position shown in FIG. 2, the outside plate 66 is in sealing contact with the seal 76 on the outside surface of the door 50 and the inside plate 68 is in sealing contact with the seal 78 on the inside surface 80 of the left side wall 32. These seals 76 and 78 keep water from entering the cargo van between the upper edge 82 of the cargo opening 44 and the edges 84 and 86 of the doors 48 and 50.

Seals (not shown) are provided between the vertical edges 88 and 90 of the cargo opening 44 and the forward end 92 of the door 48 and the rear end 94 of the door 50. Another seal (not shown) is provided between the bottom edge 96 of the cargo opening 44 and the adjacent lower edges 98 and 100 of the doors 48 and 50. A seal is also provided between the two doors 48 and 50.

Two doors 48 and 50 are shown in the drawing. One door could close the cargo opening 44. Two doors 48 and 50 are employed to reduce the weight which is manually lifted when closing the doors. More than two doors can be used if necessary. One door can be used if the door is lightweight or a power lift device is used to close the door.

Front wall 30 and the two side walls 32 and 34 as shown are fiberglass reinforced panels. These panels are very strong and durable. With adequate reinforcing, the walls of the cargo container could be made from lightweight material such as aluminum.

Latch assembly 60 can take many forms. The pivot pin or pins 62 could be secured to the upper edge 82 of the cargo opening 44 rather than to the doors 48 and 50 if desired. Another possibility would be to use pins or bars that slide in bores or slots to latch the door in the closed position. The pins or bars could be actuated manually through a mechanical linkage or by powered actuators such as fluid activated linear actuators or solenoids.

The right side wall 34 is a solid wall as shown in the drawing. If desired an elongated cargo opening 44 can be provided in both side walls.

The doors 48 and 50 are opened as shown in FIG. 4 to permit a forklift 58 to load and unload a bundle 102 of rectangular tubes 104 through the elongated cargo opening 44. Additional bundles 102 of elongated articles can be deposited on top of the bundle 102.

Cargo on pallets, in boxes or loose can be loaded through the rear door 38 to load the right side of the cargo van 20. Boxes and other cargo can also be positioned on top of the elongated bundles 102. The cargo van 20 as shown is mounted on the frame 16 of a truck 10. Such vans are commonly up to thirty feet long. The elongated cargo opening 44 is up to about twenty-eight feet long in truck mounted cargo van 20. Cargo vans 20 that are part of trailers can exceed fifty feet in length. Such cargo vans could easily accommodate an elongated cargo opening 44 that is up to twenty-eight feet long. A longer opening may require reinforcement for the portion of the side wall 32 that is above the elongated opening 44.

The disclosed embodiment is representative of a presently preferred form of the invention, but is intended to be illustrative rather than definitive thereof. The invention is defined in the claims.

I claim:

1. A vehicle mounted cargo van comprising a van frame, a floor mounted on said van frame; a front wall, a rear wall with a rear door opening and a rear door assembly that opens and closes the rear door opening, a first side wall and a second side wall connected to said van frame; a roof connected to the first side wall, the second side wall and the front wall; an elongated cargo opening in said first side wall for the passage of elongated cargo that extends vertically upward from said floor up to one-half the distance from said floor to the roof and extends horizontally a distance that exceeds the distance from the first side wall to the second side wall; at least one elongated cargo door mounted on said cargo van and movable between a generally vertical open position and a closed position in which said elongated cargo opening is at least partially closed; a fixed portion of the first side wall that extends vertically downward from the roof to the elongated cargo opening a distance of at least one-half the distance from said floor to the roof; and a latch assembly connected to the at least one elongated cargo door that holds the at least one elongated cargo door in a closed position.

2. A vehicle mounted cargo van as set forth in claim 1 wherein said at least one elongated cargo door closes said elongated cargo opening when in the closed position.

3. A vehicle mounted cargo van as set forth in claim 1 wherein said at least one elongated cargo door is pivotally attached to said cargo van for pivotal movement about a generally horizontal axis that is below a horizontal plane including a cargo support surface of said floor.

4. A vehicle mounted cargo van as set forth in claim 1 including a first elongated seal, for keeping water out, positioned between said first side wall and a vertical sealing surface carried by said at least one elongated cargo door and that permits limited vertical movement between the at least one elongated cargo door and said first side wall.

5. A vehicle mounted cargo van as set forth in claim 4 including a second elongated seal, for keeping water out, positioned between said at least one elongated cargo door and said latch assembly.

6. A vehicle mounted cargo van comprising a van frame; a floor mounted on said van frame; a front wall, a rear wall, a first side wall and a second side wall connected to said van frame; a roof connected to the first side wall, the second side wall and the front wall; an elongated cargo opening in said first side wall, for the passage of elongated cargo, that extends vertically upward from said floor less than one-half the distance from said floor to the roof and that extends horizontally a distance that exceeds three meters; a fixed portion of the first side wall that extends vertically downward from the roof to the elongated cargo opening a distance of at least one-half the distance from said floor to the roof; a front side door pivotally attached to said van frame for pivotal movement about a side door axis that is parallel to and below a horizontal plane including a cargo support surface of said floor; a front latch assembly engageable with the front side door and the first side wall to hold the front side door in a position in which a front portion of said elongated cargo opening is closed; a rear side door pivotally attached to said van frame for pivotal movement about said side door axis; and a rear latch assembly engageable with the rear side door and the first side wall to hold the rear side door in a position in which a rear portion of said elongated cargo opening is closed.

7. A vehicle mounted cargo van as set forth in claim 6 wherein said front latch assembly and said rear latch assembly both have a sealing surface that is generally vertical, when in a closed and latched position, and permits limited vertical movement of the floor relative to the first side wall.

8. A vehicle mounted cargo van as set forth in claim 6 wherein said elongated cargo opening extends horizontally substantially the entire length of the first side wall.

9. A vehicle mounted cargo van as set forth in claim 6 including a second elongated cargo opening in said second side wall, for the passage of elongated cargo, that extends vertically upward from said floor less than one-half the distance from said floor to the roof and extends horizontally a distance that exceeds three meters; and a second door assembly pivotally attached to said van frame for pivotal movement about a second side door access that is parallel to and below a plane including the cargo support surface of said floor.

10. A vehicle mounted cargo van as set forth in claim 6 including seals in sealing contact with the front side door and the rear side door.

11. A vehicle mounted cargo van as set forth in claim 6 wherein the first side wall and the second side wall are rigid members.

12. A vehicle mounted cargo van as set forth in claim 11 wherein the front side door and the rear side door are rigid members.

* * * * *